United States Patent [19]
Uzawa

[11] Patent Number: 5,250,862
[45] Date of Patent: Oct. 5, 1993

[54] MINATURE MOTOR WITH IMPROVED BEARING RETAINERS

[75] Inventor: Motohisa Uzawa, Matsudo, Japan

[73] Assignee: Mabuchi Motor Co., Ltd., Chiba, Japan

[21] Appl. No.: 890,531

[22] Filed: May 28, 1992

[30] Foreign Application Priority Data

May 30, 1991 [JP] Japan ............ 3-039506[U]

[51] Int. Cl.[5] .................. H02K 5/16; F16C 33/10
[52] U.S. Cl. ...................... 310/40 MM; 310/90; 384/13
[58] Field of Search .......... 310/40 MM, 89, 90, 43, 310/45; 384/13, 24, 625

[56] References Cited

U.S. PATENT DOCUMENTS

| | | | |
|---|---|---|---|
| 4,006,374 | 2/1977 | Nakagawa | 310/40 MM |
| 4,500,804 | 2/1985 | Akiyama | 310/40 MM |
| 4,634,298 | 1/1987 | Crawford | 384/209 |

Primary Examiner—Steven L. Stephan
Assistant Examiner—Matthew Nguyen
Attorney, Agent, or Firm—McGlew and Tuttle

[57] ABSTRACT

A miniature motor comprising a housing made of a metallic material, formed into a bottom hollow cylindrical shape, and having a permanent magnet on the inner circumferential surface thereof, a rotor consisting of a commutator and an armature facing the permanent magnet, and an end plate fitted to the opening of the housing and having brushes for making sliding contact with the commutator and input terminals for electrically connecting to the brushes; the rotor being rotatably supported by oil-impregnated bearings fixedly fitted to bearing retainers each provided on the bottom of the housing and the endplate; in which a plurality of local projections are provided on the inside end faces of the bearing retainers, and the oil-impregnated bearings are positioned and held in place by bringing the end faces of the oil-impregnated bearings into contact with the local projections.

6 Claims, 2 Drawing Sheets

MINATURE MOTOR WITH IMPROVED BEARING RETAINERS

BACKGROUND OF THE INVENTION

This is invention relates generally to a miniature motor used in power tools, household electric appliances (vacuum cleaners, etc.), for example, and more particularly to a miniature motor whose bearings retainers for holding oil-impregnated bearings are improved.

DESCRIPTION OF THE PRIOR ART

FIG. 1 is a longitudinal sectional view illustrating the essential part of a miniature motor to which this invention is applied. In FIG. 1, reference numeral 1 refers to a housing, made of a metallic material, such as mild steel, formed into a bottomed hollow cylindrical shape and having a permanent magnet 2 formed into an arc segment shape, for example, on the inner circumferential surface thereof. A rotor 5 comprising an armature 3 facing the permanent magnet 2 and a commutator 4 is provided in the housing 1. Next, numeral 6 refers to an end plate, made of the same metallic material as that of the housing 1, and formed in such a fashion as to be engaged with the opening of the housing 1. Numeral 7 refers to a brush arm adapted to make sliding contact with the commutator 4 and provided on the end plate 6, together with input terminal 8 electricality connected to the brash arm 7. Numerals 9 and 10 refer to oil-impregnated bearings fixedly fitted to bearing retainers It and 12 each provided on the bottom of the housing I and the end plate 6, respectively.

With the above construction, when current is fed from the input terminal 8 to the, armature 3 via the brush arm 7 and the commutator 4 constituting the rotor 5, rotating for is imparted to the armature 3 existing in a magnetic field formed by the permanent magnet 2 fixedly fitted to the inner circumferential surface of the housing 1, causing the rotor 5 to rotate, and external equipment (not shown) to be driven via a shaft 13.

Next, FIGS. 2 and 3 are longitudinal sectional views illustrating the essential part of an example of the bearing retainer 12 shown in FIG. 1. Like parts are indicated by like numerals in FIG. 1. In FIG. 2, numeral 14 refers to a gap formed between the inside end face of the bearing retainer 12 and the end face of the oil-impregnated bearing 10. FIG. 3 shows the essential part of another example of the bearing retainer 12 in which the oil-impregnated bearing 10 is positioned and held in place by bringing the end face of the oil-impregnated bearing 10 in direct contact with the inside end face of the bearing retainer 12. Numeral 17 refers to a through hole.

FIG. 4 is a longitudinal sectional view illustrating the essential part of still another example of the bearing retainer 12 shown in FIG. 1. FIG. 5 is the right-hand side view of the essential part shown in FIG. 4. Like parts are indicated by like numerals used in FIG. 1. In FIGS. 4 and 5, numeral 15 refers to a right-shaped projection provided on the inside end face of the bearing retainer 12; 16 to a ring-shaped groove formed on the outside end face of the bearing retainer 12 to form the ring-shaped projection 15.

The bearing retainer 12 of the conventional construction has the following problems. (The same applies to the bearing retainer 11 on the side of the housing 1.)

In the example shown in FIG. 2, the oil-impregnated bearing 10 has a construction apt to move in the axial direction. That is, if the oil-impregnated bearing 10 is shifted to the right by an impact, vibration, etc. exerted on the end plate 6 during the rotation of the rotor 5, the gap between the commutator 4 and the oil-impregnated bearing 10 is increased, causing the shaft 13 to further protrude from the end plate 6. If the oil-impregnated bearing 10 is shifted to the left, on the other hand, the protruded length of the shaft to the right is reduced. If the protruded length of the shaft 13 deviates from a predetermined value in this way, the miniature motor cannot perform its proper functions. To cope with this problem, the oil-impregnated bearing 10 has to be press-fitted more tightly to secure it in position, or impact and vibration to the miniature motor have to be reduced to the minimum.

The construction shown in FIG. 3 has a problem of lubricant seeping out of the oil-impregnated bearing 10 and flowing to the outside through the through hole 17. This may prevent oil films from adequately forming on the contact surface with the shaft 13, leading to the wear of the shaft 13 and the inner circumferential surface of the oil-impregnated bearing 10, and to the seizing, or failure, of the miniature motor in extreme cases. To avoid such inconveniences, the volume of lubricant oil has to be increased by increasing the capacity of the oil-impregnated bearing 10. This may result in an increase in the size of the miniature motor. In addition, if the through hole 17 is eliminated in the aforementioned construction, the contact area between the shaft 13 and the oil-impregnated bearing 10 could be reduced, deteriorating the functions of the miniature motor substantially.

Furthermore, in the construction shown in FIGS. 4 and 5, the lubricant seeping out of the oil-impregnated bearing 10 tends to stay around the ring shaped projection 15. This may reduce the volume of lubricant fed to the contact surface between the oil-impregnated bearing 10 and the shaft 13, preventing oil films from adequately forming on the contact surface. This may pose similar inconveniences as encountered with the construction shown in FIG. 3.

SUMMARY OF THE INVENTION

It is the first object of this invention to provide a miniature motor in which oil-impregnated bearings are fixedly fitted in bearing retainers.

It is the second object of this invention to provide a miniature motor in which normal oil films are stably formed on the contact surface between the shaft and the oil-impregnated bearings.

DETAILED DESCRIPTION OF EMBODIMENTS

Figure 1:
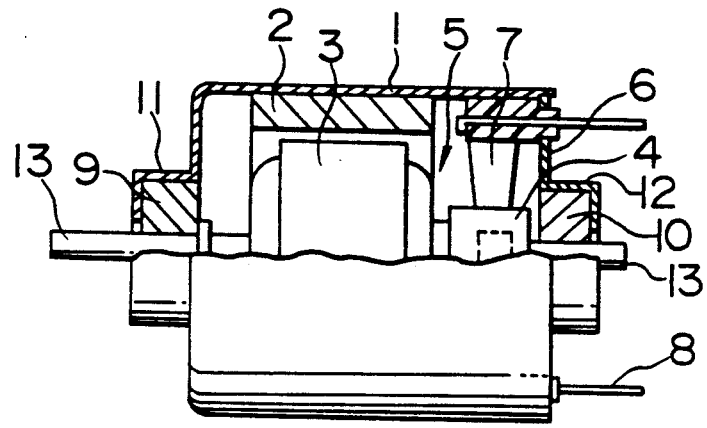
FIG. 1 is a longitudinal sectional front view of an example of the miniature motor to which this invention is applied.
Figure 2:
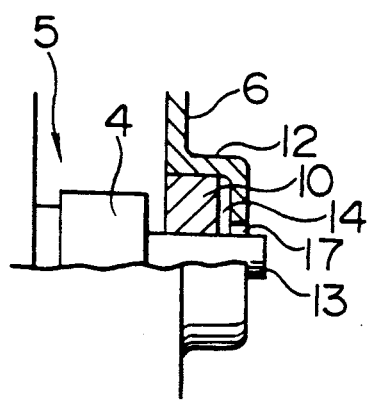
FIGS. 2 through 4 are longitudinal sectional views illustrating the essential part of a bearing retainer.
Figure 3:
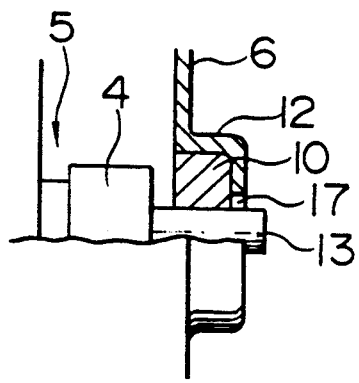
Figure 4:
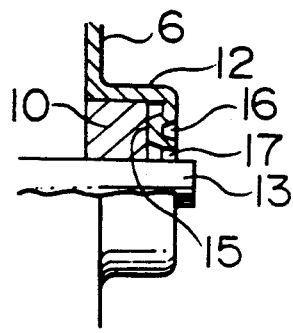
Figure 5:
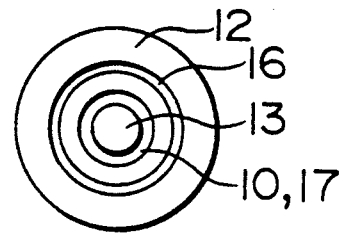
FIG. 5 is a right-hand side view of the essential part shown in FIG. 4.
Figure 6:
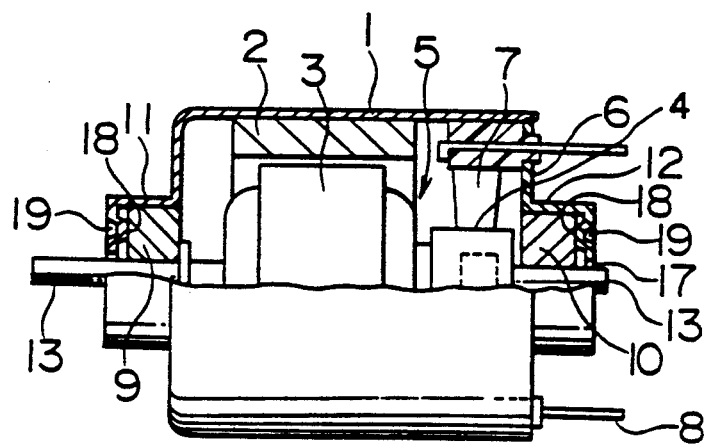
FIGS. 6 and 7 are longitudinal sectional front and right-hand side views of an embodiment of this invention.
Figure 7:
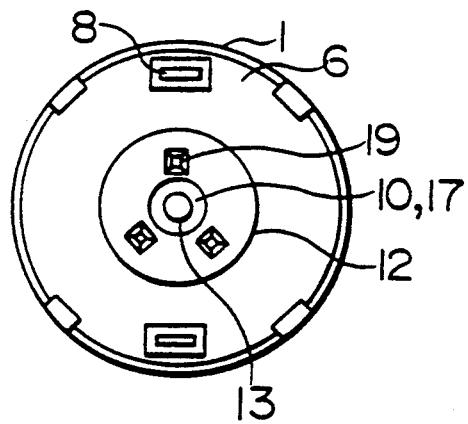

FIGS. 6 and 7 are longitudinal sectional front and right-hand side views of an embodiment of this invention. Like parts are indicated by like numerals shown in FIGS. 1 through 5. In FIGS. 6 and 7, numeral 18 refers to local projections provided on the inside end faces of bearing retainers 11 and 12 provided on a housing 1 and an end plate 6. The local projections 18 should preferably be provided at circumferentially equal spacings and with the same protruded length.

Such local projections 18 can be provided by forming recesses 19 by a punch or male die (both not shown) from the outside surfaces of the bearing retainers 11 and 12 when stamping the housing 1 and the end plate 6 from a metal sheet.

With the above-mentioned construction, the oil-impregnated bearings 9 and 10 are positioned at predetermined locations and fixedly fitted to the bearing retainers 11 and 12 by placing and press-fitting the oil-impregnated bearings 9 and 10 in the bearing retainers 11 and 12 each provided on the housing 1 and the end plate 6 from the inside until the end faces thereof come in contact with the local projections 18. Consequently, the oil-impregnated bearings 9 and 10 can be fixedly fitted with the minimum required press-fitting or fastening allowances, and prevented from unwanted shifting in the axial direction. Since the local projections 18 provided on the inside end faces of the bearing retainers 11 and 12 are discontinuous in the circumferential direction, as shown in FIG. 7, there is no fear of inconveniences encountered with the ring-shaped projection 15, and lubricant can be fed smoothly.

Although the end plate 6 is made of a metallic material in this embodiment, the end plate 6 may be made of any material, such as a thermoplastic resin, and injection molding may be employed to form the end plate 6. The shape and dimensions of the local projection 18 provided on the bearing retainers 11 and 12 can be freely selected. The number of the local projections 18 should be at least two, or more preferably more than three.

This invention having the aforementioned construction and operation makes it possible to provide a miniature motor in which oil-impregnated bearings are positively and tightly held in bearing retainers, and lubricant can be fed smoothly from the oil-impregnated bearings to the shaft to ensure formation of normal oil films, and which has resistance to impact and vibration and maintains consistent quality and performance.

What is claimed is:

1. A miniature motor, comprising:
  a housing made of a metallic material, formed into a bottomed hollow cylindrical shape and having a permanent magnet on the inner circumferential surface thereof;
  a rotor including a commutator and an armature facing said permanent magnet;
  and end plate fitted to the opening of said housing and having brushes for making sliding contact with said commutator and having input terminals electrically connected to said brushes;
  a bearing retainers formed on said bottom of said housing and formed on said end plate, said bearing retainers including a bottomed hollow cylindrical shaped portion defining a recess in each of said bottom of said housing in said end plate, said bearing retainers each having a bearing retainer end face with a plurality of local projections extending inwardly; and
  oil-impregnated bearings having a cylindrical shape, said oil impregnated bearings being positioned in said recess of a corresponding one of said bearing retainers such that an end face of each of said oil-impregnated bearings faces said inside end face of said bearing retainer wherein said end face of each said oil-impregnated bearings contact each of said plurality of local projections of said corresponding one of said bearing retainers.

2. A miniature motor as set forth in claim 1 wherein said projections are disposed at equal spacings on a circumference with the center thereof at the shaft center of said oil-impregnated bearings.

3. A miniature motor as set forth in claim 1 or (2) wherein said end plate is made of a metallic material, and said projections are formed by a plastic working means.

4. A miniature motor as set forth in claim 1 or (2) wherein said end plate is made of a plastic material.

5. A miniature motor, comprising:
  a housing made of a metallic material, formed into a bottomed hollow cylindrical shape and having a permanent magnet on the inner circumferential surface thereof;
  a rotor including a commutator and an armature facing said permanent magnet;
  and end plate fitted to the opening of said housing and having brushes for making sliding contact with said commutator and having input terminals electrically connected to said brushes;
  a bearing retainers formed on said bottom of said housing and formed on said end plate, said bearing retainers including a bottomed hollow cylindrical shaped portion defining a recess in each of said bottom of said housing in said end plate, said bearing retainers each having a bearing retainer end face with a plurality of local projections extending inwardly; said local projections being spaced apart in a circumferential direction; and
  oil-impregnated bearings having a cylindrical shape, said oil impregnated bearings being positioned in said recess of a corresponding one of said bearing retainers such that an end face of each of said oil-impregnated bearings faces said inside end face of said bearing retainer wherein said end face of each said oil-impregnated bearings contact each of said plurality of local projections of said corresponding one of said bearing retainers.

6. A miniature motor, comprising:
  a housing made of a metallic material, formed into a bottomed hollow cylindrical shape and having a permanent magnet on the inner circumferential surface thereof;
  a rotor including a commutator and an armature facing said permanent magnet;
  and end plate fitted to the opening of said housing and having brushes for making sliding contact with said commutator and having input terminals electrically connected to said brushes;
  a bearing retainers formed on said bottom of said housing and formed on said end plate, said bearing retainers including a bottomed hollow cylindrical shaped portion defining a recess in each of said bottom of said housing in said end plate, said bearing retainers each having a bearing retainer end face with a plurality of local projections extending inwardly; and
  oil-impregnated bearings having a cylindrical shape, said oil impregnated bearings being positioned in said recess of each bearing retainers such that an end face of each of said oil-impregnated bearings faces said inside end face of said bearing retainer wherein said end face of each said oil-impregnated bearings contact each of said plurality of local projection, said local projections being disposed at equal spacings in a circumferential direction, spaced from a center of said oil-impregnated bearings.

* * * * *